US009852851B2

(12) United States Patent
Fonseca et al.

(10) Patent No.: US 9,852,851 B2
(45) Date of Patent: Dec. 26, 2017

(54) MOLDED CASE CIRCUIT BREAKER WITH CURRENT SENSING UNIT (71) Applicant: General Electric Company, Schenectady, NY (US)

(72) Inventors: Shawn Couceiro Fonseca, Newington, CT (US); Dhirendra Kumar Tiwari, Farmington, CT (US); Ansel O'mar Reid, Middletown, CT (US); Dana Edmond Foster, Torrington, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 465 days.

(21) Appl. No.: 14/519,734

(22) Filed: Oct. 21, 2014

(65) Prior Publication Data
US 2016/0111230 A1  Apr. 21, 2016

(51) Int. Cl.
*H01H 9/02* (2006.01)
*H02H 3/08* (2006.01)
*H01H 9/54* (2006.01)
*H01H 69/00* (2006.01)
*H01H 71/02* (2006.01)
*H01H 71/08* (2006.01)

(52) U.S. Cl.
CPC ............ *H01H 9/0271* (2013.01); *H01H 9/54* (2013.01); *H01H 69/00* (2013.01); *H01H 71/02* (2013.01); *H01H 71/08* (2013.01); *H02H 3/08* (2013.01); *H01H 2223/044* (2013.01)

(58) Field of Classification Search
CPC .... H01H 9/0271; H01H 71/0271; H01H 9/54; H01H 69/00; H01H 71/02; H01H 71/08; H01H 2223/044; H02H 3/08
See application file for complete search history.

(56) References Cited

U.S. PATENT DOCUMENTS

| 5,321,378 A * | 6/1994 | Ferullo | H01H 71/125 335/202 |
| 6,329,810 B1 | 12/2001 | Reid | |
| 6,482,048 B1 * | 11/2002 | Fleege | G01R 31/025 439/801 |
| 6,515,840 B2 | 2/2003 | Covi et al. | |
| 6,538,862 B1 * | 3/2003 | Mason, Jr. | H02H 3/335 361/42 |

(Continued)

OTHER PUBLICATIONS

Cooley et al., "A Retrofit 60 HZ Current Sensor for Power Monitoring at the Circuit Breaker Panel"; Control and Modeling for Power Electronics (COMPEL), 2010 IEEE 12th Workshop; Jun. 28-30, 2010; pp. 1-7.

*Primary Examiner* — Zeev V Kitov
(74) *Attorney, Agent, or Firm* — GE Global Patent Operation; Stephen G. Midgley (57) ABSTRACT A circuit breaker, and method of assembling the circuit breaker, includes a circuit breaker housing defining an interior portion, and which includes a molded base and a separable cover. The molded base includes an interior surface and an exterior surface. The exterior surface of the molded base is operatively disposed outside of the interior portion of the circuit breaker housing, and the exterior surface of the base defines at least one current sensing unit receiving cavity configured to receive a current sensing unit therein. The molded base and separable cover are cooperatively disposed to surround the interior portion of the circuit breaker housing.

17 Claims, 6 Drawing Sheets (56) References Cited

U.S. PATENT DOCUMENTS

| | | | |
|---|---|---|---|
| 7,239,490 B2 * | 7/2007 | Benke | H01H 33/666 |
| | | | 218/118 |
| 2003/0179526 A1 | 9/2003 | Culler et al. | |
| 2004/0050820 A1 | 3/2004 | McKean et al. | |
| 2005/0046539 A1 | 3/2005 | Ciarcia et al. | |
| 2007/0053127 A1 | 3/2007 | Dobbs et al. | |
| 2011/0019387 A1 | 1/2011 | De Geus et al. | |
| 2011/0128655 A1 | 6/2011 | Hochlehnert et al. | |
| 2016/0148761 A1 * | 5/2016 | Parra | H01H 9/0264 |
| | | | 200/304 |

\* cited by examiner

MOLDED CASE CIRCUIT BREAKER WITH CURRENT SENSING UNIT

BACKGROUND OF THE INVENTION

The subject matter disclosed herein relates to a molded case circuit breaker having a current sensing unit.

Molded case circuit breakers ("MCCB") are widely used to protect electrical lines and equipment, and are recognized by their rectangular plastic case. The MCCB monitors current through an electrical conductor and "trips" to open the electrical circuit and thus interrupt current flow through the circuit provided that certain predetermined criteria are met, such as an over-current condition. An electronic trip unit ("ETU") is a device that can be used in conjunction with the MCCB to control the current (and/or voltage) versus time trip response. The ETU is a programmable device that measures and times current flowing through the circuit breaker and initiates a trip signal when appropriate.

Current-sensing transformers sense circuit current and provide current signals to the ETU for processing. Current transformers and Rogowski coils monitor the current in the MCCB. The current transformer is used for powering the ETU without use of external auxiliary power. The current transformer provides current output to the ETU that is proportional to the primary current flowing through it. The Rogowski coil is used for saturation free measurement of current in the conductor of the circuit breaker. The Rogowski coil provides a voltage output that is proportional to the time derivative of the current, rather than a current output like traditional current transformers. The current sensors, whether they are thermal-magnetic, thermal only, magnetic only, current transformers only, Rogowski coils only, or current transformers/Rogowski coils combination, are installed internal to the circuit breaker housing of the MCCB during assembly.

BRIEF DESCRIPTION OF THE INVENTION

According to one aspect of the invention, a circuit breaker includes a circuit breaker housing defining an interior portion, and which includes a molded base and a separable cover. The molded base includes an interior surface and an exterior surface. The exterior surface of the molded base is operatively disposed outside of the interior portion of the circuit breaker housing, and the exterior surface of the base defines at least one current sensing unit receiving cavity configured to receive a current sensing unit therein. The molded base and separable cover are cooperatively disposed to surround the interior portion of the circuit breaker housing.

According to another aspect of the invention, a molded case circuit breaker includes a circuit breaker housing defining an interior portion, a set of fixed contacts, a set of movable contacts, and an operating mechanism, and a current sensing unit. The circuit breaker housing includes a molded base and a separable cover. The molded base includes an interior surface and an exterior surface. The exterior surface of the molded base is operatively disposed outside of the interior portion of the circuit breaker housing, and the exterior surface of the base defines at least one current sensing unit receiving cavity configured to receive a current sensing unit therein. The molded base and separable cover are cooperatively disposed to surround the interior portion of the circuit breaker housing. The operating mechanism is arranged to operate the set of movable contacts relative to the fixed contacts, and the operating mechanism, fixed contacts, and movable contacts are disposed within the interior portion of the circuit breaker housing. The current sensing unit is disposed within the current sensing unit receiving cavity, and is accessible from an exterior of the housing without removal of the separable cover.

According to yet another aspect of the invention, a method of assembling a molded case circuit breaker includes inserting a load strap corresponding to a respective pole of the circuit breaker through a respective aperture defined by a molded base of a circuit breaker housing, and arranging an operating mechanism, set of movable contacts, and set of fixed contacts in an interior potion of the circuit breaker housing. A separable cover is secured to the molded base to surround the interior portion of the circuit breaker housing. At least one current sensing unit is installed in at least one current sensing unit receiving cavity defined by an exterior surface of the molded base, the exterior surface of the molded base operatively disposed outside of the interior portion of the circuit breaker housing such that a current sensing element of the at least one current sensing unit surrounds the load strap for each respective pole of the circuit breaker.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
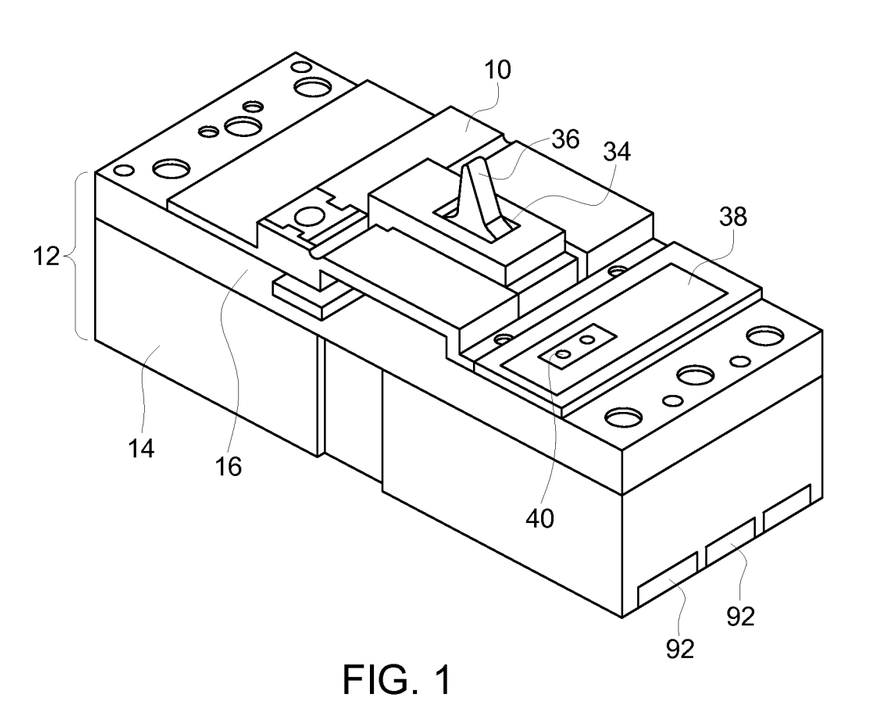
FIG. 1 is perspective view of an exemplary embodiment of an exterior of a circuit breaker.
Figure 2:
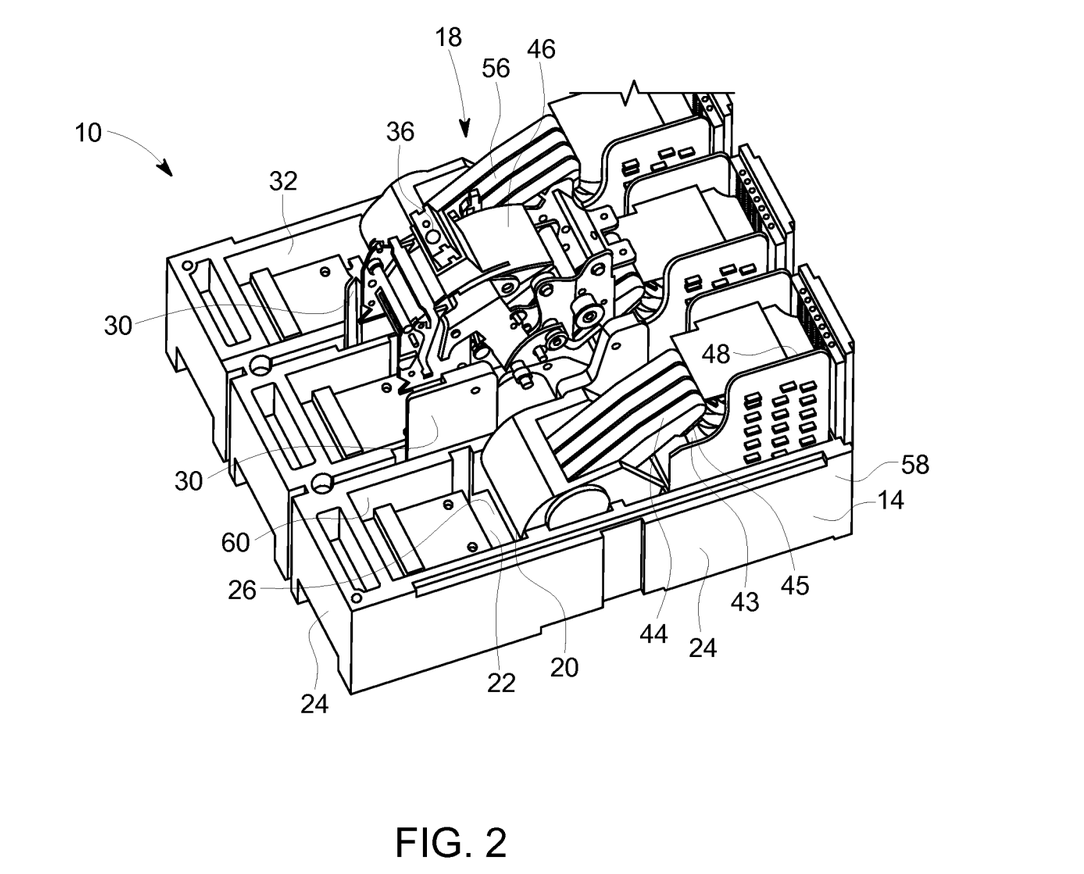
FIG. 2 is a perspective view of an exemplary embodiment of an interior of the circuit breaker.

FIG. 1 illustrates an exemplary embodiment of an exterior of a molded case circuit breaker 10. The circuit breaker 10 includes a circuit breaker housing 12, and the circuit breaker housing 12 is a molded case 14 and includes a separable cover 16 and a molded base 22. With further reference to FIG. 2, the molded base 22 supports the operating components, designated generally at 18, of the circuit breaker 10 within an interior portion 20 of the circuit breaker housing 12. In the illustrated embodiment, the molded base 22 further includes a number of walls 24, however walls may alternatively or additionally extend from the separable cover 16. Also, a midcover may optionally be employed interposed between the separable cover 16 and base 22. The base 22 includes an interior surface 26 and an exterior surface 28. The components 18 of the circuit breaker 10 are disposed upon the interior surface 26 of the molded base 22. The interior surface 26 may include any number of separating protrusions/walls 30 and indentations 32 for receiving the various components 18 for each pole of the particular circuit breaker 10. A portion of the circuit breaker operating components 18 may be assembled within the base 22 using automated assembly on the interior surface 26 of the base 22, which provides a reduction in circuit breaker assembly time. The base 22 is formed of a non-conductive plastic material selected to provide good heat withstanding properties in order not to be distorted by the circuit breaker components 18 upon overload current conditions. Such a plastic material may include, but is not limited to, a thermoplastic material, thermoset plastic, and mixtures thereof which have the capability of being molded into the required shape of the base 22 for receipt of the circuit breaker operating components 18. The base 22 may additionally be provided with a plurality of ridges and grooves for facilitating robotic assembly of the circuit breaker components 18 upon the molded base 22.

After the circuit breaker operating components 18 are assembled upon the interior surface 26 of the molded base 22, whether automatically, manually, or a combination of automatically and manually, the cover 16, as shown in FIG. 1, is securely fastened to the base 22. The cover 16 includes a handle slot 34 for passing a handle operator 36 of the circuit breaker 10. The cover 16 is also formed from a molded plastic material. The interior portion 20 of the circuit breaker 10 is surrounded by the cover 16 and the base 22.

Also shown in FIG. 1 is an electronic trip unit ("ETU") 38 and a rating plug 40 coupled to the ETU 38. The ETU 38 of the circuit breaker 10 trips to open an electric circuit, and therefore interrupts current flow when necessary. The ETU 38 includes microprocessor platforms configured to ensure reliable protections. Different protection such as overload, short circuit, and residual (ground fault) protection are possible with ETU 38, and can be programmed to accommodate different requirements. The rating plug 40 sets a current rating, which is maximum continuous current permitted in the electronic circuit during each individual phase and supplies a specified current rating to the ETU 38. As will be further described below, current transformers 42 of the circuit breaker 10 are electrically coupled to the ETU 38 and provide current to the ETU 38. The illustrated circuit breaker 10 demonstrates a three pole circuit breaker 10, however any number of poles may be employed in the circuit breaker 10. The current transformer 42 is used within each pole of the protected circuit to sample circuit current on a continuous basis.

Turning now to the interior perspective view of the circuit breaker 10 shown in FIG. 2, some of the operating components 18 of the circuit breaker 10 are depicted. It should be understood that while a particular arrangement of the operating components 18 are described herein, different arrangements may also be accommodated to support different layouts and end uses. Further, additional components 18 may be incorporated to complete the circuit breaker 10. The circuit breaker 10 generally includes a contact system 44, operating mechanism 46, lay shaft (not shown), arc chamber 48, line strap 50, and load strap 52. The circuit breaker 10 also includes a current sensing unit 54, as will be further described below. The contact system 44, sometimes referred to as the current path or current carrying system of the circuit breaker 10, includes a set of fixed and a set of movable contacts 43, 45. The fixed contacts 43 are electrically connected to the line straps 50, and the movable contacts 45 are supported by a movable contact arm 56, which is electrically connected to the load strap 52. In an exemplary embodiment, the electrical connection may be via flexible copper braid (not shown). In a normal "on" or closed condition of the circuit breaker 10, the fixed and movable contacts 43, 45 are physically connected to each other due to applied mechanical pressure on the movable contacts 45, in which the contact arm 56 is moved to make contact between the movable contacts 45 and the fixed contacts 43. In an "off" or open condition of the circuit breaker 10, the movable contacts 45 are separated, such as via opening spring, from the fixed contacts 43, as illustrated in FIG. 2. The contact system 44 makes or breaks the circuit based on current conditions, carries rated current without over heating, provides adequate contact pressure and depression to keep the contacts 43, 45 closed in normal conditions, provides sufficient force to open contact system 44 with desired velocity during abnormal condition, and provides dielectric isolation when contacts are in an open condition.

The operating mechanism 46 serves as a storing energy device for the circuit breaker 10. The operating mechanism 46 includes an arrangement to store potential energy that is released if a switching signal is sent to the breaker 10. The potential energy can be stored in the circuit breaker 10 such as by deforming a main operating mechanism spring. Alternatively, potential energy is stored by compressed air, by hydraulic pressure, etc. Once this stored energy is released in the form of kinetic energy, the movable contact 45 moves since the movable contacts 45 are mechanically attached via the contact arms 56 through linkages to the lay shaft, also referred to as a drive shaft, and then to the operating mechanism 46. The lay shaft acts as a connecting member between the operating mechanism 46 and the contact system 44 and helps to transfer the motion from operating mechanism 46 to the contact system 44.

The arc chamber 48, also referred to as a quenching device or arc chute, includes a high dielectric housing material with arc plates assembled substantially parallel to each other. When the movable contacts 45 open and move away from the fixed contacts 43, arc is generated. The arc is guided and wraps back and forth between the arc plates of the arc chamber 48 until it is extinguished or quenched in the arc chamber 48.

Figure 3:
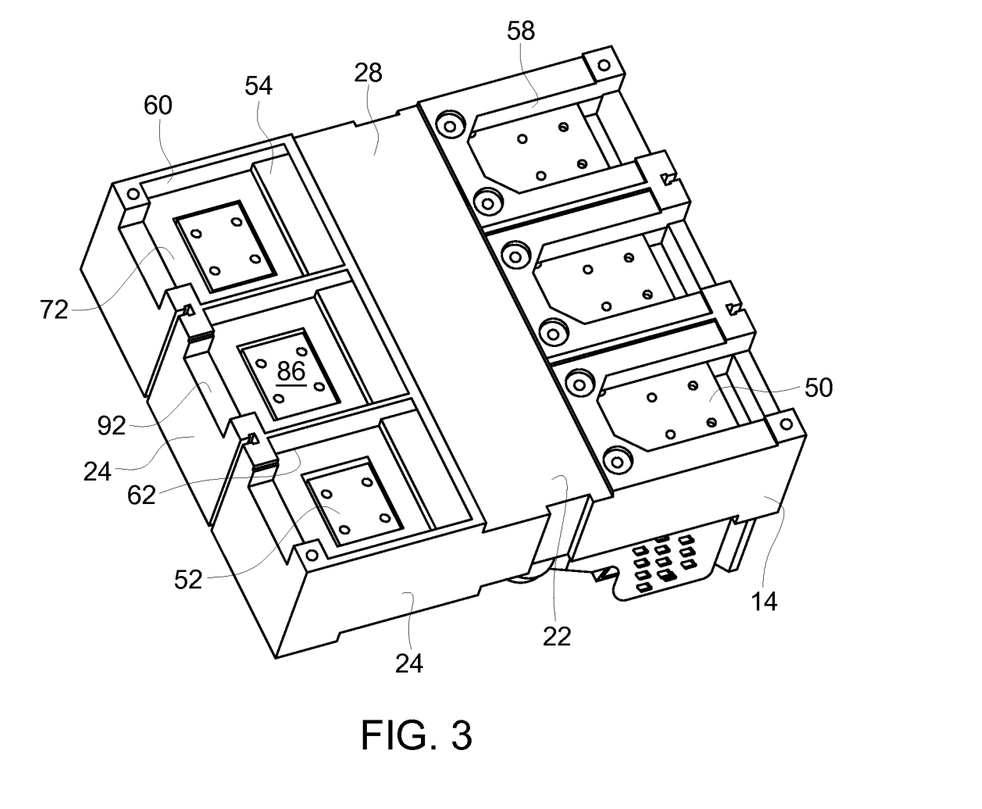
FIG. 3 is a perspective view of an exemplary embodiment of the circuit breaker.
Figure 4:
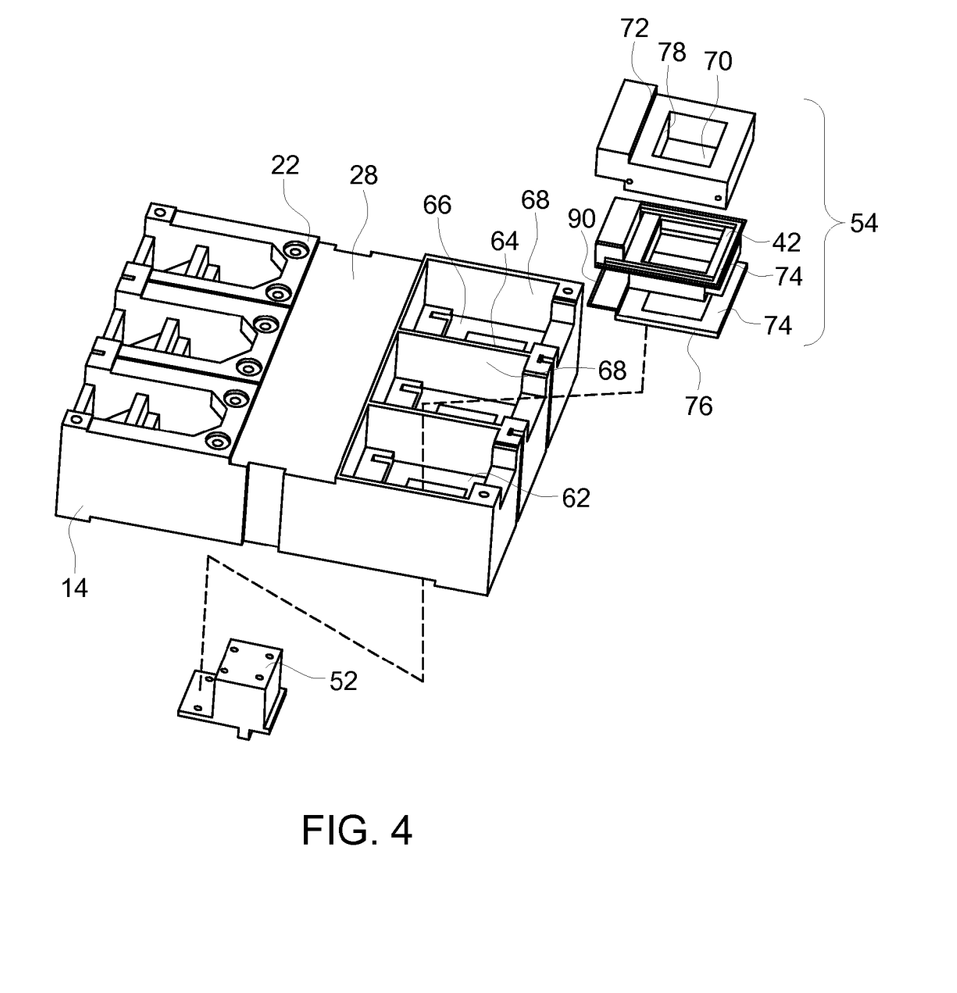
FIG. 4 is an exploded perspective view of portions of the circuit breaker.

As can be seen in FIG. 2, the above-described operating components 18, including the contact system 44, operating mechanism 46, lay shaft (cross-bar), and arc chamber 48 are assembled on the interior surface 26 of the molded base 22. A depth of the base 22 in a line-side portion 58 is greater than a depth of the base 22 at a load-side portion 60. This is because a current sensing unit 54 of the circuit breaker 10, which is normally provided about the load strap 52, is not disposed within the base 22, and therefore interior space does not need to be allocated in the interior portion 20 of the housing 12 for the current sensing unit 54. With reference now to FIGS. 3 and 4, the exterior surface 28 of the base 22 is shown to have a molded recess or current sensing unit receiving cavity 62 at the load-side portion 60 of the base 22. The current sensing unit receiving cavity 62 includes an aperture 64 through which the load strap 52 extends from the interior 20 of the housing 12 to an exterior of the base 22, and the current sensing unit receiving cavity 62 and the load strap 52 are accessible from the exterior surface 28 of the base 22. The line strap 50 may also be accessible from the exterior surface 28 of the base 22, but at the line-side portion 58. The molded current sensing unit receiving cavity 62 includes a cavity end surface 66, which is formed by a portion of the exterior surface 28 of the base 22, and cavity walls 68 extending from the cavity end surface 66.

An exemplary current sensing unit 54 is shown as disposed in the molded current sensing unit receiving cavity 62 in FIGS. 3 and 4. The current sensing unit 54 includes an opening 70 for allowing the load strap 52 to extend therethrough. The current sensing unit receiving cavity 62 is sized to adequately yet snugly receive the current sensing unit 54 therein. That is, the current sensing unit 54 includes an outer periphery that substantially matches an inner periphery of the current sensing unit receiving cavity 62 so that the current sensing unit 54 remains at least relatively stationary relative to the load strap 52 when installed. The current sensing unit 54 further includes a current sensing unit housing 72 that may be used to protect at least some of the surfaces of the current sensing elements 74 within the current sensing unit 54, such as the interior surfaces thereof (those facing the load strap 52) to protect them from the load strap 52 that extends through the opening 70 in the current sensing unit 54. The current sensing unit housing 72 is formed of an insulative material, such as, but not limited to, thermoplastic, thermal polymer, etc. When installed, the current sensing unit 54 will be placed in the current sensing unit receiving cavity 62 such that the housing 72, which is made of an insulative material, will provide isolation of the load strap 52 from the current sensing elements 74. The current sensing unit housing 72 may be configured to hold the current sensing unit 54 together as an integrated unit, such that the current sensing unit 54 including the current sensing unit housing 72 and the current sensing elements 74 are insertable within and removable from the current sensing unit receiving cavity 62 as an integral unit.

Exemplary current sensing elements 74 in the current sensing unit 54 include a Rogowski coil 76 and the current transformer assembly 42, although variations of the current sensing unit 54 may include only the former or the latter, as well as alternate or additional sensors. The current transformer 42 is used for powering the ETU 38 without use of external auxiliary power, while the Rogowski coil 76 is used for saturation free measurement of current in the conductor of the circuit breaker 10. The current sensing elements 74 are required for sensing the current and then allowing the ETU 38 to provide protection. An alternating current in a conductor develops magnetic field and the interaction of this field and the Rogowski coil 76 local to the field gives rise to an induced voltage within the Rogowski coil 76, which is proportional to the rate of change of current being measured. The current sensing elements 74, including the current transformer 42 and the Rogowski coil 76, should not touch the load straps 52, and therefore the current sensing unit housing 72 includes at least an inner surface 78 that serves to isolate the current sensing elements 74 from the load strap 52.

While the current sensing unit housing 72 for each current sensing unit 54 is illustrated as separately covering the current sensing elements 74 therein, in another exemplary embodiment, any number of the current sensing units 54 may be attached together via their respective current sensing unit housings 72. In such an embodiment, two or more of the current sensing units 54 would be installable at the same time within their respective cavities 62.

Figure 5:
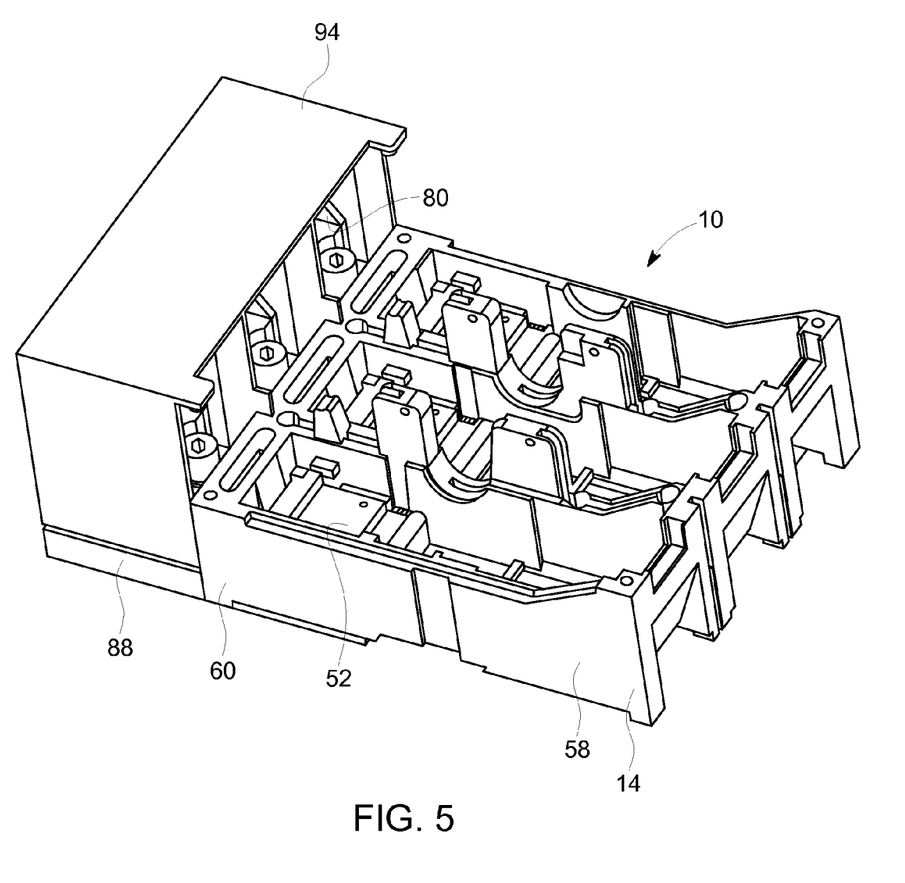
FIG. 5 is a perspective view of portions of the circuit breaker with an exemplary embodiment of lugs and a lug cover; and, FIG. 6 is a perspective exploded view of the lugs, lug cover, and circuit breaker.
Figure 6:
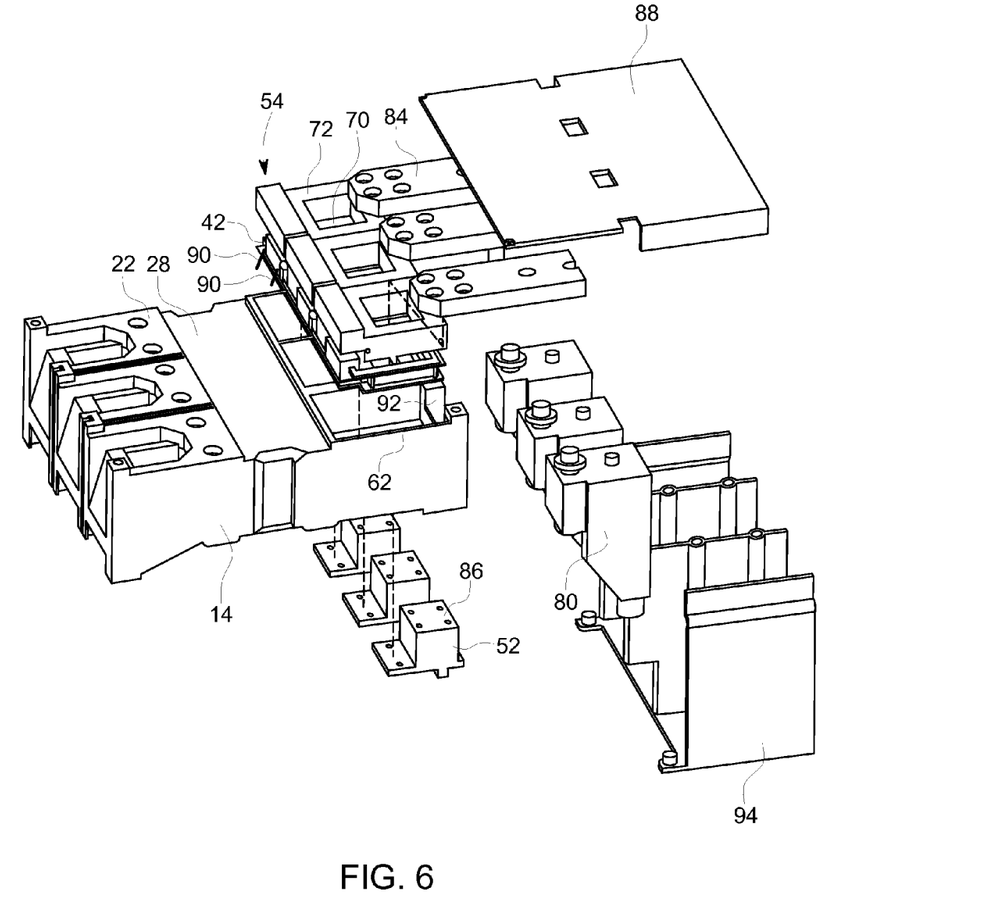

With reference to FIGS. 5-6, to allow connection with external electrical circuits to be protected by the circuit breaker 10, load lugs 80 may be installed with the circuit breaker 10, and may be field installable or factory assembled. The circuit breaker 10 is shown with attached exemplary load lugs 80 and load lug cover 94. The load lugs 80 are electrically connected to the load strap 52 via a conductive connection element 84, which may have a strap shape as illustrated. Due to the plate-like or strap-like structure of the conductive connection element 84, and the end surface 86 of the load strap 52, the conductive connection element 84 will lay substantially flush in a face-to-face relationship with the end surface 86 of the load strap 52. As shown in FIG. 3, at least a portion of the current sensing unit 54, when seated within the current sensing unit receiving cavity 62, may be substantially flush with the end surface 86 of the load strap 52, but may be slightly recessed from the exterior surface 28 of the base 22 directly adjacent to the current sensing unit receiving cavity 62. The load lugs 80 are connected with the load straps 52 via the conductive connection elements 84, and in doing so, the current sensing units 54 are disposed between the molded base 22 and the conductive connection elements 84. Indentations 92 may be provided in the side wall 24 at the load-side portion 60 of the case 14 for aligning the conductive connection elements 84 therein. A protective plate 88 covers the conductive connection elements 84, as well as overlapping and providing additional protection to the current sensing units 54 and load lugs 80. The protective plate 88 may be non-conductive, and the conductive connection elements 84 are operably disposed between the protective plate 88 and the end surfaces 86 of the load straps 52. The lug cover 94 is seated on the protective plate 88 adjacent the wall 24 at the load-side portion 60 of the case 14. The lug cover 94 surrounds the load lugs 80, in combination with the housing 12 of the circuit breaker 10.

The current sensing unit 54 may include electrical connectors 90, depicted schematically in FIG. 6, for the current sensing elements 74, such as, but not limited to, electrical wires, pig tails, pins, or electrical contacts, to connect and electrically couple the current sensing elements 74 to the ETU 38. For example, in one exemplary embodiment, the current sensing unit 54 may include connector pins as the electrical connectors 90 such that installation of the current sensing unit 54 into the current sensing unit receiving cavity 62 aligns the connector pins with connector pin receiving apertures in the current sensing unit receiving cavity 62 that can serve to electrically connect the current sensing unit 54 to the ETU 38. Alternatively, the molded base 22 may have connector pins extending therefrom that insert into connector pin receiving apertures in the current sensing unit 54 to electrically connect the current sensing unit 54 to the ETU 38. In yet another alternative embodiment of an electrical connection, the current sensing elements 74/current sensing unit 54 and the molded base 22 may have cooperating electrical contacts, similar to electrical contacts between batteries and a battery-powered device. A connection can be made with a flexible contact region that has spring-like properties to ensure that an electrical signal is reliably transferred.

A method of assembling the molded case circuit breaker 10 includes inserting the load strap 52 for each pole of the circuit breaker 10 through a respective aperture 64 in the molded base 22, and arranging operating components 18 on the interior surface 26 of the molded base 22. The separable cover 16 is secured to the molded base 22 to form the circuit breaker housing 12. At least one current sensing unit 54 is installed in at least one current sensing unit receiving cavity 62 molded into the exterior surface 28 of the molded base 22, such that the current sensing element 74 of the at least one current sensing unit 54 surrounds a periphery of the load strap 52 for each pole of the circuit breaker 10.

By mounting the current sensing unit 54 external to the circuit breaker 10, it can be decided at a late stage of assembly what type of sensing element 74, or which combination of sensing elements 74 should be used. If a current sensing unit is installed internally within a circuit breaker, it would have to be decided at a much earlier stage of assembly what sensor to employ. In order to effectively sense the current passing through the conductive path of each pole, the sensing elements 74 need to be around the current path. The design of the circuit breaker 10 allows for the entire breaker 10 to be assembled, with the load straps 52 of the breaker 10 extending through the housing 12 for customer termination points. The current sensing unit 54 is then assembled around the load straps 52 external to the circuit breaker 10. The sensing unit 54 has its own thin housing 72 so as to not expose the components, current sensing elements 74, within, thus providing insulation and protection. The molded base 22 of the molded case circuit breaker 10 is designed in such a way as to separate the current sensing unit 54 from the internal components 18 of the circuit breaker 10.

It should be understood that current sensing units, although relatively small, consume a large percentage of an interior of a prior molded case circuit breaker. By moving the sensing units 54 to the exterior of the housing 12 in the circuit breaker 10, more space is allowed within the interior portion 20 for arrangement of the operating components 18, and the overall size of the circuit breaker 10 is impacted. The circuit breaker is capable of being much smaller by pushing the current sensing units 54 to the extreme edges of the circuit breaker 10, and eliminating the potential with interferences with other components 18 within the circuit breaker 10. The size constraints of prior molded case circuit breaker housings limit the geometry of the core of the current transformer to a size just sufficient to provide operating power to the ETU circuit without becoming saturated at the higher ampere ratings due to the low inductance of the smaller core.

Also, during assembly, when current sensing elements of prior molded case circuit breakers are internally installed, they need to go around the load strap. When the load strap includes copper flexible braids welded directly to it, which are also welded on the opposite end to copper contact arms, which in turn are a part of a much larger assembly including the crossbar, the other two poles, and the operating mechanism, in order to mount the current sensing elements in this configuration, the current sensing elements would need to be one of the first components assembled within the assembly, prior to welding. Then the entire assembly needs to be mounted in its entirety in the housing of the circuit breaker, which is a difficult process and which requires that the ratings of the current sensing elements be determined and selected before the circuit breaker is even assembled. Thus, the circuit breaker 10 described herein allows for the current sensing elements 74 to be removed from this assembly altogether, and allows for current sensor selection at an end stage of assembly.

Further, the circuit breaker 10 provides for improved accuracy of the current sensing unit 54. Since the current sensing unit 54 will be sitting in a fixed location with the maximum amount of conductor (load strap 52) passing through its opening 70, and with very limited movement of the current sensing unit 54 with respect to the load strap 52, due to the substantially same outer periphery of the current sensing unit 54 as an inner periphery of the cavity 62, accuracy and sensitivity will be improved. Also, sensor testing is improved because the circuit breaker 10 having the exteriorly positioned current sensing unit 54 allows for the current sensing elements 74 to be easily tested and calibrated on the circuit breaker 10 in the manufacturing plant, or even in the field for maintenance, with incredible ease since removal of the separable cover 16 is not required, nor any other sort of disassembly of the housing 12.

The use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A circuit breaker comprising:
  a circuit breaker housing defining an interior portion having a line-side and an opposing load-side, the circuit breaker housing comprising:
    a molded base having an interior surface and an exterior surface; and
    a separable cover coupled to the molded base;
    wherein the exterior surface of the molded base is disposed outside of the interior portion of the circuit breaker housing, the exterior surface of the molded base having a current sensing unit receiving cavity defined therein configured to receive a current sensing unit therein;
  wherein the depth of the line-side interior portion of the base is greater than the depth of the load-side interior portion of the base.

2. The circuit breaker of claim 1, further comprising a current sensing unit disposed within the current sensing unit receiving cavity, wherein the current sensing unit is insertable from an exterior of the housing without removal of the separable cover.

3. The circuit breaker of claim 2 wherein the current sensing unit includes a current sensing unit housing and current sensing element, the current sensing unit housing arranged to cover at least a portion of the current sensing element.

4. The circuit breaker of claim 3, wherein the current sensing housing and the current sensing element are installable therein and removable therefrom the current sensing unit receiving cavity as an integrated unit.

5. The circuit breaker of claim 2, further comprising a load strap corresponding to a respective pole of the circuit breaker, wherein the load strap extends from the interior portion, through the molded base, and into the current sensing unit receiving cavity, and wherein a current sensing element of the current sensing unit is disposed around the load strap.

6. The circuit breaker of claim 5, further comprising a conductive connection element electrically coupled to the load strap, at least a portion of the current sensing unit operably disposed between the exterior surface of the molded base and the conductive connection element.

7. The circuit breaker of claim 6, further comprising a lug for each respective pole of the circuit breaker, each lug electrically coupled to each respective conductive connection element.

8. The circuit breaker of claim 6, further comprising a protective plate, the conductive connection element operably disposed between the load strap and the protective plate.

9. The circuit breaker of claim 2, further comprising an electronic trip unit and an electrical connector for the current sensing element, the current sensing element electrically coupled to the electronic trip unit.

10. The circuit breaker of claim 2, further comprising a set of fixed contacts, a set of movable contacts, and an operating mechanism arranged to operate the set of movable contacts relative to the set of fixed contacts, the operating mechanism, fixed contacts, and movable contacts disposed within the interior portion of the housing.

11. The circuit breaker of claim 1, wherein the molded base is formed of non-conductive plastic.

12. The circuit breaker of claim 1, wherein the molded base is formed as a single piece unit.

13. A molded case circuit breaker comprising:
a molded base having an interior surface and an exterior surface;
a separable cover coupled to the molded base, and cooperatively defining an interior portion therebetween;
a conductive load strap corresponding to a respective pole of the circuit breaker disposed within the interior portion;
wherein the exterior surface of the molded base is disposed outside of the interior portion, the exterior surface of the molded base having a current sensing unit receiving cavity defined therein, the current sensing unit receiving cavity configured to receive a current sensing unit therein; and
a current sensing unit disposable within the at least one current sensing unit receiving cavity to operably surround the load strap without removal of the separable cover.

14. The molded case circuit breaker of claim 13, wherein the load strap extends from the interior portion, through the molded base, and into the current sensing unit receiving cavity.

15. The molded case circuit breaker of claim 14, further comprising a conductive connection element electrically coupled to the load strap, wherein at least a portion of the at least one current sensing unit is operably disposed between the exterior surface of the base and the conductive connection element.

16. The molded case circuit breaker of claim 13, further comprising a fixed contact, a movable contact, and an operating mechanism arranged to move the movable contact relative to the fixed contact,
wherein the operating mechanism, fixed contact, and movable contact are disposed within the interior portion.

17. The molded case circuit breaker of claim 13, wherein the at least one current sensing unit is removable from the current sensing unit receiving cavity without removal of the separable cover.

\* \* \* \* \*